Oct. 2, 1951     M. J. O. LOBELLE     2,569,819
AIRCRAFT GUNSIGHT MOUNTING
Filed Oct. 26, 1948     7 Sheets-Sheet 1
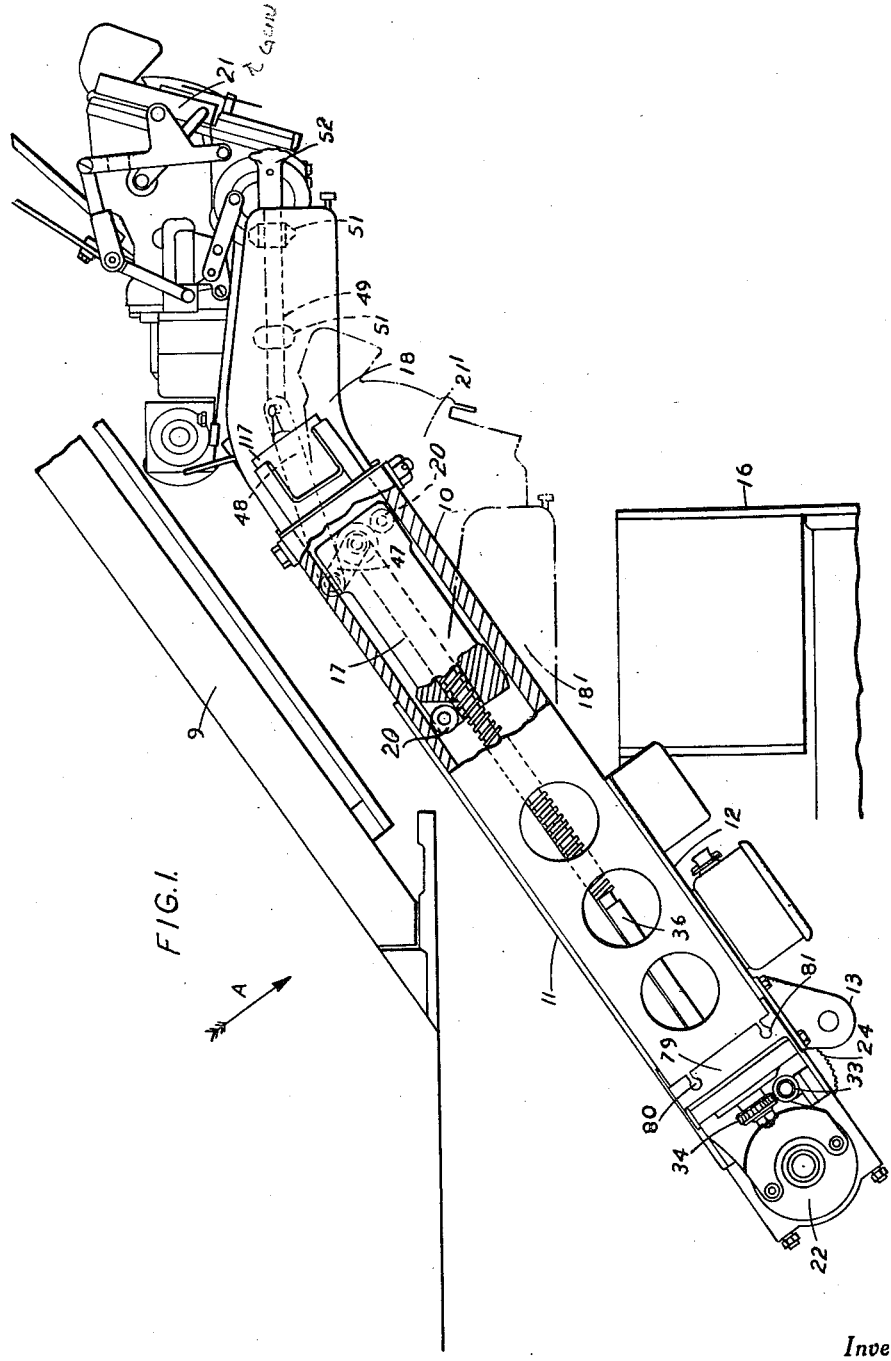
Inventor
Marcel J. O. Lobelle
By Emery, Holcombe & Blair
Attorneys

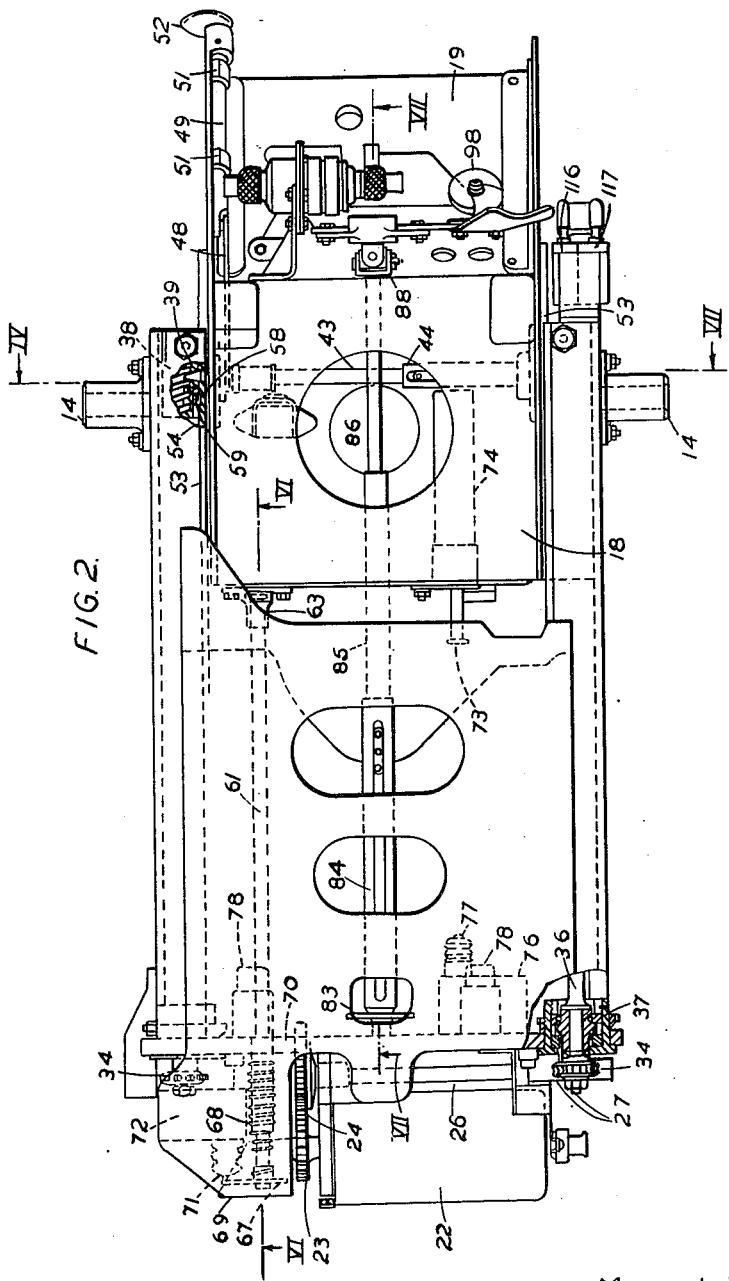

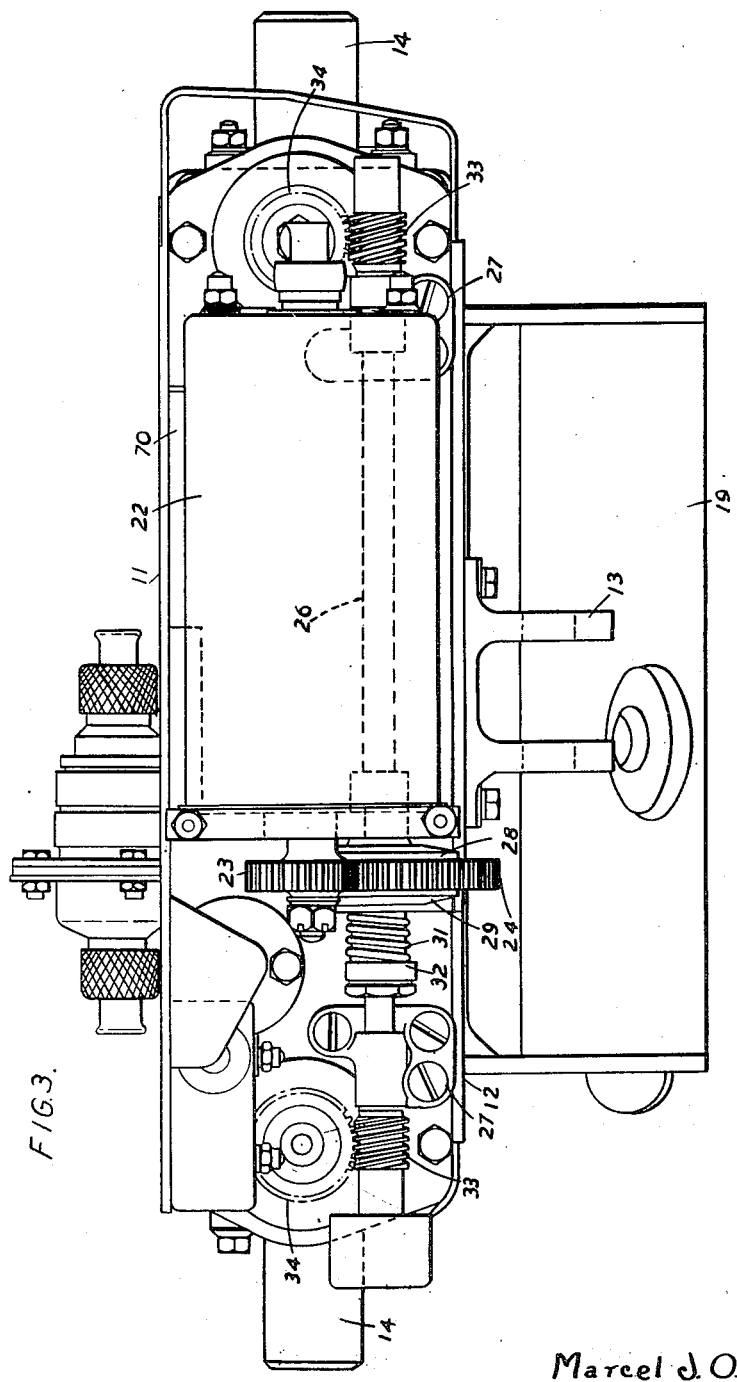

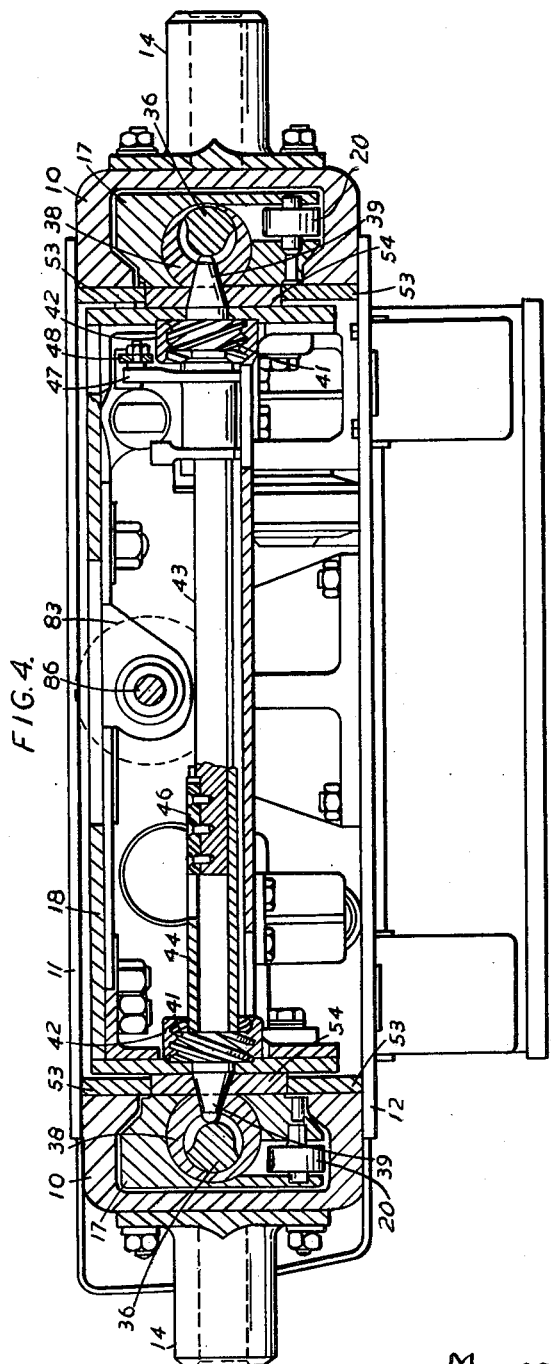

Oct. 2, 1951   M. J. O. LOBELLE   2,569,819
AIRCRAFT GUNSIGHT MOUNTING
Filed Oct. 26, 1948   7 Sheets-Sheet 5
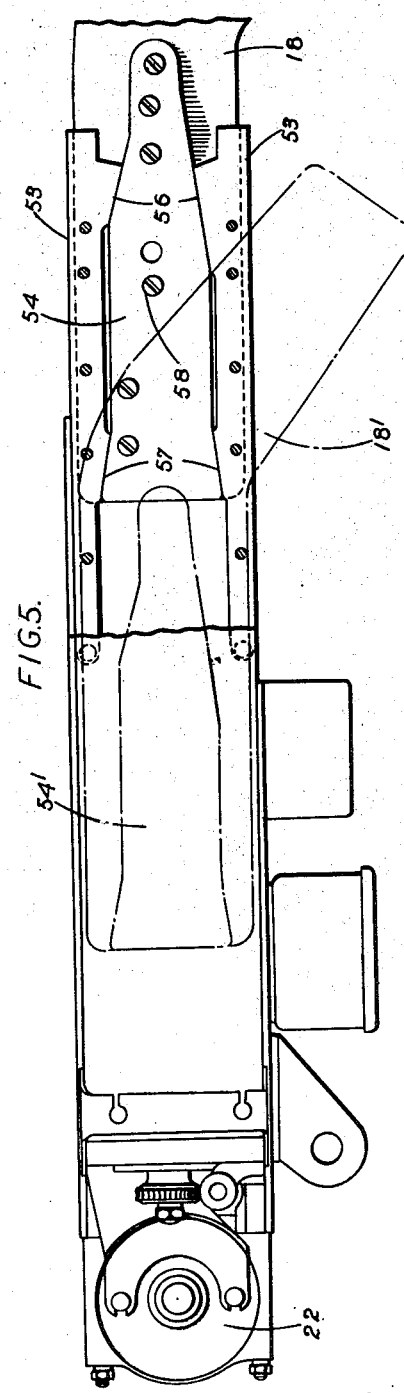
Inventor
Marcel J. O. Lobelle
By Emery, Holcombe & Blair
Attorneys

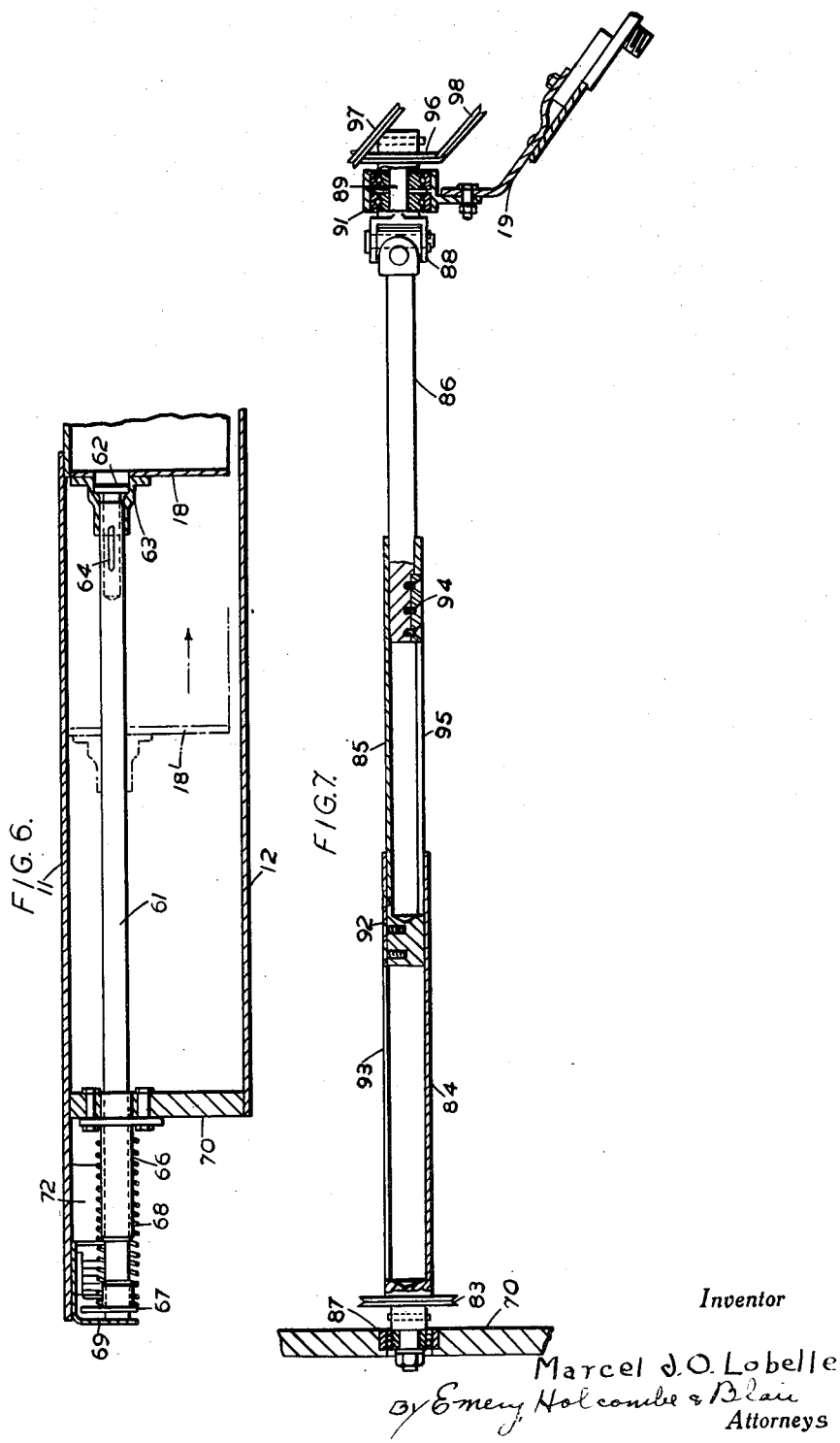

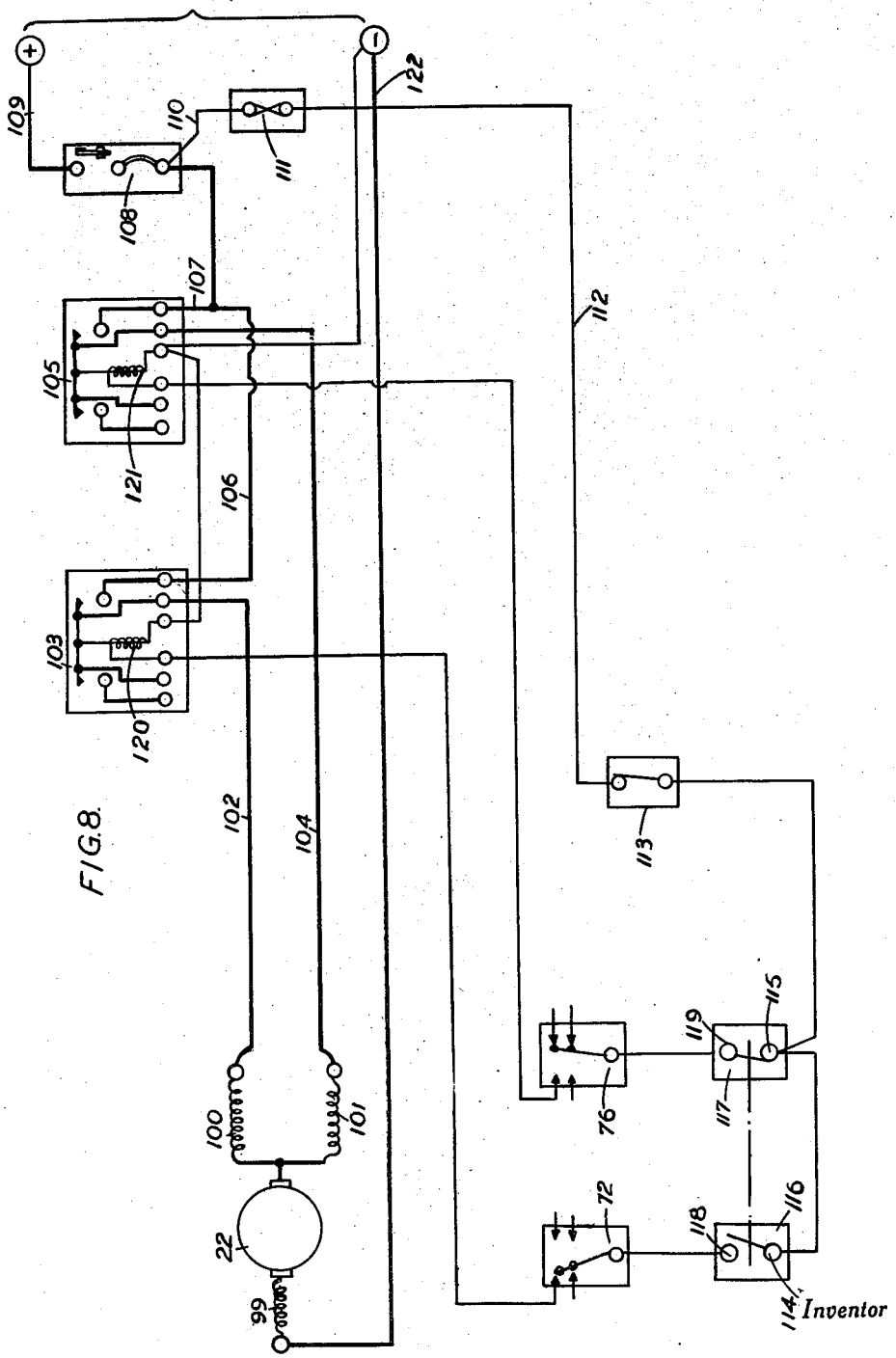

Patented Oct. 2, 1951

2,569,819

UNITED STATES PATENT OFFICE 2,569,819

AIRCRAFT GUN SIGHT MOUNTING

Marcel Jules Odilon Lobelle, Maidenhead, England, assignor to M. L. Aviation Company Limited, Maidenhead, England, a British company Application October 26, 1948, Serial No. 56,536
In Great Britain June 30, 1947

8 Claims. (Cl. 33—49)

This invention relates to the mounting of sighting mechanism for guns and the like in aircraft, and particularly to retractably supported self-controlled apparatus for use with fixed armament.

A type of gunsight having fairly general use in aircraft is provided with range control mechanism. The incorporation of such mechanism in a gunsight tends to increase the size of a gunsight up to a point where it seriously interferes with the pilot's forward vision, and moreover it constitutes a likely cause of injury to the pilot in the event of a mishap to the aircraft. Furthermore, in aircraft provided with means for automatically ejecting the pilot together with his seat in case of emergency, the pilot is liable to injure his legs during ejection owing to the nearness with which the gunsight has to be mounted to the pilot's eye. With these disadvantages in mind it has been proposed to mount the gunsight so that it may be retracted when not required for use.

It is the principal object of this invention to provide a readily controlled power-operated retracting mechanism, which, when operated to bring the gunsight into the combat position, will bring it to rest in an invariable position of alignment with respect to the aircraft.

A further object is to provide a manually controlled over-ride mechanism for disconnecting the power drive to the carriage, so that retraction of the carriage can be initiated by hand in an emergency.

Another object is to provide the gunsight mounting with trip mechanism adapted to stop the power drive to the carriage as the latter approaches its terminal positions in the mounting so that the carriage may slow down towards these positions of rest.

Yet another object is to incorporate in the gunsight mounting, transmission mechanism for transmitting movement from a remote control device to range control mechanism on the gunsight.

A convenient form of the gunsight mounting for carrying the invention into effect is illustrated in the accompanying drawings in which:

Figure 1 is a side elevation of the gunsight mounting showing the general arrangement in the aircraft cock-pit;

Figure 2 is a front elevation of the gunsight mounting viewed in the direction of arrow A in Figure 1, but with the gunsight removed;

Figure 3 is an end view as seen from the left in Figure 2, though on an enlarged scale;

Figure 4 is a section on the line IV—IV of Figure 2 on an enlarged scale;

Figure 5 is a side elevation of the gunsight mounting on an enlarged scale, showing the arrangement of the wedge locking plates, other details being omitted for clarity;

Figure 6 is a section on the line VI—VI of Figure 2 showing details of the upper limit switchgear;

Figure 7 is a section on the line VII—VII of Figure 2 showing details of the range control transmission mechanism;

Figure 8 is a wiring diagram of the motor control circuit.

Referring to Figures 1 to 4, the guide frame comprises a pair of channelled guides 10 held in parallel relationship by spacing plates 11 and 12 bolted across them. The frame is mounted on the aircraft by means of a lug 13 fixed to the plate 12 at the base of the frame and by lugs 14 which are bolted to the channelled guides 10 and the upper part of the frame. As shown in Figure 1, the gunsight mounting occupies an inclined position behind the bullet-proof wind-shield 9, extending fore and aft of the instrument panel 16.

The channels in the channelled guides 10 are arranged facing each other and they form slideways for runner blocks 17, which are fixed on each side of the gunsight carriage 18, and are provided with rollers 20 on opposite corners for guiding them in the slideway. The upper part of the carriage 18 is provided with a platform 19 on which the gunsight 21 is mounted. For raising or lowering the carriage in the guides 10, an electric motor 22 is mounted at the base of the guide frame, the armature of the motor carrying a pinion gear 23 meshing with a pinion gear 24 mounted on a shaft 26 which extends across the base of the guide-frame and is supported in bearings 27 on each side of the frame. The pinion gear 24 is not fixed on the shaft 26 but is held in relation to the shaft by a friction clutch which consists of a friction disc 28 fixed to the shaft 26 on one side of the pinion 24 and a free friction disc 29 supported on the shaft on the other side of the pinion 24, the pinion 24 being compressed between the discs 28 and 29 by means of a compression spring 31 interposed between the disc 29 and a collar 32 fixed to the shaft 26. The ends of the shaft 26 which project beyond the bearings 27 carry worms 33 which mesh with worm wheels 34 fixed on the ends of lead screws 36 which are mounted in thrust bearings 37 situated in the base of the frame, one such bearing 31 being shown in detail in the cut-away section in Figure 2.

The lead screws 36 extend within the channelled guides 10 and are formed over the greater part of their length with a buttress-type screw thread which passes through clearing holes in eccentric bushes 38 which fit into bores in the runner blocks 17. The drive for the carriage is effected by means of cone-tipped pins 39 which pass through conical holes in the bushes 38 and are situated during normal operation with their tips engaged between the flanks of the threads of the lead screws 36. At the base of each pin 39 is fixed a collar 41 formed with a multiple start screw thread of coarse pitch which is in threaded engagement with a correspondingly screwed bush 42 fixed to each side of the carriage while each pin 39 and collar 41 has a shank, in one case a rod 43 and in the other case a tube 44. The shanks 43 and 44 have a longitudinal key and slot connection at 46 so that the pins 39 can turn in unison either to engage or disengage the threads on the lead screws 36, the threads on the collars 41 and bushes 42 being formed with opposite pitch for this purpose. The shanks 43 and 44 of the pins 39 can be turned by means of a lever 47 which is fixed to the shank 43, while a link 48 connects the lever 47 to a rod 49 which is slidably arranged in cleats 51 secured to the upper portion of the carriage. A flat-headed knob is fixed on the projecting end of the rod 49 and can be pulled to engage, or pushed in the direction of retraction of the carriage 18 to disengage the driving connection between the lead screws 36 and the carriage 18. For normal operation, the knob 52 is kept extended and its main purpose is as an override control to enable the driving connection to the carriage 18 to be broken quickly in an emergency so that the carriage can be retracted rapidly by gravity aided by the hand of the pilot pushing in the direction to retract said carriage.

It is arranged to locate the carriage 18 in its upper or combat position so that the gunsight 21 comes into a position of invariable and accurate alignment with respect to the frame and the aircraft itself, by providing a pair of wedge plates 53 on each side of the channels 10, and co-operating wedge plates 54 fixed on each side of the carriage 18, said plates together constituting means for locating said apparatus with the speed and precision essential to accurate rapid fire.

As seen in Figure 5, the wedge plates 53 and 54 are stepped so that the location between them is effected in two places at 56 and 57. The wedge plates 54 are, of course, apertured so that the conical pins 39 can pass through them, and in addition, each wedge plate 54 carries a grub screw 58, see Figure 2, which enters a slot 59 in the eccentric bush 38. The pin and slot connection thus provided between the carriage 18 to which the wedge plates are attached, and the eccentric bushes 38, serves a double purpose in that it facilitates assembly of the gunsight mounting and also that the grub screws 58 assist the pins 39 in preventing the bushes 38 from turning.

It is essential that the carriage 18 shall not wedge too firmly against the plates 53 in the combat position, lest the gunsight be subjected to an undesirable shock or the motor 22 be unable subsequently to withdraw the carriage. Trip mechanism is accordingly provided to switch off the motor 22 before the carriage 18 reaches the end of its upward travel, so that it will slow down and come to rest gently against the wedge plates 53.

The trip mechanism as seen in Figures 2 and 6 consists of a rod 61 one end of which is slidably mounted in a bush 63 fixed to the base of the carriage 18, and it is prevented from withdrawing from the bush 63 by the head of an adjuster nut 62 which is secured into the end of the rod 61. The rod 61 then passes through a sleeve 66 which is secured to the base 70 of the frame, while the end of the rod 61 projecting beyond the sleeve 66 carries an actuating arm 67. A coiled compression spring 68 surrounding the sleeve 66 between the base 70 and the actuating arm 67 maintains the head of the screw 62 normally in engagement with the bush 63. As the carriage 18 approaches the end of its upward travel, the actuating arm 67 comes into contact with the head 71 of a switch 72 which then breaks the current to the motor 22 sufficiently in advance of the final position of the carriage 18 to allow the latter to reach this final position and come to rest gently against the wedge plates 53. The extent of this ultimate movement without power is adjusted after assembly of the gunsight mounting by setting the screw 62 in the rod 61, and when the correct position is found, the screw 62 and the rod 61 are relatively fixed by a locking wire 64.

In order that the rod 61 shall not project beyond the lower end of the gunsight mounting when the carriage 18 is in the retracted position 18', a bracket 69 is attached to the plate 11 to engage the lower end of the rod 61. As the carriage 18 is retracted, the bush 63 on the base of the carriage 18 slides freely over the rod 61.

Lower limit switch-gear is similarly provided to break the current to the motor 22 towards the end of the retraction movement and this trip mechanism comprises a spring loaded actuating pin 73 mounted in a barrel 74 attached to the carriage 18 and a lower limit switch 76 having a head 77 arranged in the path of the rod 73. As an additional safeguard, the base 70 of the frame is provided with shock absorbers 78 for cushioning the carriage 18 at the end of its downward travel.

In Figure 1, the gunsight 21 and carriage 18 are shown in full lines in the combat position, while in the retracted position they are shown in chain lines at 21' and 18' respectively. Similarly, in Figure 5, the carriage 18 and wedge plate 54 are shown in full lines in the position where the wedge plates 53 and 54 are in engagement but in the retracted position the carriage and wedge plates are shown in chain lines at 18' and 54' respectively.

The type of gunsight for which the retractable mounting is intended, has range control mechanism which is operated from a remote control device external to the mounting and situated on one side of the cock-pit. The control movement is transmitted from the control device by cables which enter and leave the guide frame through apertures 80 and 81 in a bracket 79 on the side of the guide frame. Within the guide frame, the cables pass round a grooved pulley wheel 83, see Figures 2 and 7, on the end of an assembly of telescopic tubes mounted in the centre of the guide frame. The assembly of telescopic tubes comprises three elements 84, 85 and 86 the lower and larger diameter element 84 being mounted by a ball-bearing 87 in the base 70 of the guide frame, while the upper element 84 is coupled through universal joint 88 with a spindle 89 mounted in ball-bearings 91 in the platform 19 which carries the gunsight. The intermediate tubular element 85 is provided with a key 92 which works in a longitudinal slot 93 in the element 84, while the element 86 is similarly provided with a key 94 which works in a longitudinal slot 95 in the intermediate element 85. The spindle 89 will thus turn in unison with the lower tubular element 84 and pulley 83, while the assembly of tubes 84, 85 and 86 can telescope when the carriage 18 is retracted. The end of the spindle 89 projecting upwardly through the ball-bearings 91 carries a pulley wheel 96 round which cables pass, the two lengths of cable then passing over pulleys 97 and 98, the loop being completed round a pulley on a gunsight.

The cables referred to and the pulley on the gunsight are not shown in the drawings.

The operation of the retracting mechanism will now be described with reference to the electrical circuit diagram in Figure 8. The electric motor 22 is reversible, having one field winding 100 energised for upward movement of the carriage 18 and the other field winding 101 energised for downward movement. The "up" field 100 is connected by a lead 102 through an "up" relay 103 and the "down" field 101 is connected by a lead 104 through a "down" relay 105, while leads 106 and 107 from the relays 103 and 105 respectively have common connection through a circuit breaker 108 with a supply wire 109. Another lead 110 on the relay side of the circuit breaker passes through a fuse 111 connected by lead 112 to a single pole switch 113 and thence to the poles 114 and 115 on one side of a pair of ganged switches 116 and 117 respectively. The other poles 118 and 119 of the ganged switches 116 and 117 respectively, are connected through the "up" limit switch 72 and the "down" limit switch 76 respectively, to the actuating coils 120 and 121 respectively of the "up" and "down" relays 103 and 105. The other ends of the coils 120 and 121 are connected to the other supply wire 122, the supply wire 122 also leading to the armature winding 99 of the motor 22. When the carriage 18 is fully retracted, the "up" limit switch 72 is closed and the "up" relay 103 is inoperative because the switch 116 is open. The switch 117 on the other hand is closed though the "down" limit switch 72 is held open by the carriage. If the ganged switches 116 and 117 are operated to raise the carriage 18, current is switched through the "up" limit switch 72 to energise the "up" relay 103 which then switches the "up" field 100 of the motor 22 in circuit. As the carriage 18 rises, the "down" limit switch 72 is closed by the disengagement of the downwardly operating trip mechanism and is thus in readiness to complete the circuit effecting downward movement when the ganged switches 116 and 117 are subsequently changed over. When the carriage 18 nears the end of its upward travel, the upwardly operating trip mechanism opens the switch 72 to break the circuit through the up-relay 103 to stop the motor 22. The control circuit operates in a similar manner for downward movement of the carriage.

I claim:

1. A retractable gunsight mounting for aircraft comprising a guide frame, means for mounting said frame in the aircraft, a carriage slidably mounted in said frame, gunsight supporting means fixed upon said carriage, reversible power-operated means adapted to advance said carriage towards, and to retract it from the combat position, and precision locating means adapted to align said gunsight in fixed relation with respect to said frame when advanced into said combat position.

2. A retractable gunsight mounting for aircraft comprising a guide frame, means for mounting said frame in the aircraft, a carriage slidably mounted in said frame, gunsight supporting means fixed upon said carriage, reversible power-operated means adapted to advance said carriage towards, and to retract it from the combat position, one set of wedge shaped elements fixedly associated with said carriage and another set of wedge shaped elements fixedly associated with said frame, both sets of said wedge shaped elements being adapted to co-operate one with the other to align said gunsight in fixed relation with respect to said frame when advanced into said combat position.

3. A retractable gunsight mounting for aircraft comprising a guide frame, means for mounting said frame in the aircraft, parallel channelled guides in said frame, runner blocks adapted to slide in said guides, a gunsight supporting carriage fixed to said runner blocks, reversible power-operated means adapted to advance said carriage towards, and to retract it from the combat position, and precision locating means adapted to align said gunsight in fixed relation with respect to said frame when advanced into said combat position.

4. A retractable gunsight mounting for aircraft comprising a guide frame, means for mounting said frame in the aircraft, parallel channelled guides in said frame, runner blocks adapted to slide in said guides, a gunsight supporting carriage attached to said runner blocks, lead-screws mounted in said guides and extending through said runner blocks in driving connection with said carriage, reversible rotary driving means adapted to rotate said lead screws, and locating means adapted to align said gunsight in fixed relation with respect to said frame when advanced by the rotation of said lead screws into the combat position.

5. A retractable gunsight mounting according to claim 4, including manually controllable override mechanism for rendering inoperative the driving connection between said lead-screws and said carriage, said override mechanism being adapted to break said driving connection when manually operated upon.

6. A retractable gunsight mounting according to claim 4, including override mechanism for rendering inoperative the driving connection between said lead-screws and said carriage, said override mechanism being adapted to break said driving connection, and manual control means connected to said override mechanism, wherein said control means is adapted to be operated under pressure applied in the direction of retraction of said carriage.

7. A retractable gunsight mounting for aircraft comprising in combination a guide frame, means for mounting said frame in the aircraft, a gunsight supporting carriage slidably mounted in said frame, reversible power-operated means adapted to advance said carriage towards, and to retract it from the combat position, locating means adapted to align said gunsight in fixed relation with respect to said frame when advanced into said combat position and means adapted to transmit movement from a remote control device to range control mechanism on said gunsight, said transmission means including an assembly of telescopic tube elements rotatably supported at one end in said frame and at the other end in said carriage.

8. A retractable gunsight mounting for aircraft comprising a frame having guides, means for mounting said frame in the aircraft, a carriage slidably mounted in said guides, gunsight supporting means fixed upon said carriage, a reversible electric motor adapted to advance said carriage forwards, and to retract it from the combat position, trip mechanism adapted to break the current to said motor before said carriage reaches its terminal position in said guides, and precision locating means adapted to arrest said gunsight and hold it in fixed position with respect to said frame in said terminal position.

MARCEL JULES ODILON LOBELLE.

REFERENCES CITED

The following references are of record in the file of this patent:

UNITED STATES PATENTS

| Number | Name | Date |
|---|---|---|
| 607,344 | Cooper | July 12, 1898 |
| 813,979 | Lauber et al. | Feb. 27, 1906 |
| 894,275 | Marble | July 28, 1908 |
| 910,931 | Libby | Jan. 26, 1909 |
| 1,057,048 | Farrow | Mar. 25, 1913 |
| 1,674,100 | Fitch | June 19, 1928 |
| 1,835,357 | Townsend | Dec. 8, 1931 |
| 2,291,971 | Lienau et al. | Aug. 4, 1932 |
| 2,390,013 | Trotter | Nov. 27, 1945 |